United States Patent [19]
Lebkuchner

[11] Patent Number: 5,941,500
[45] Date of Patent: Aug. 24, 1999

[54] VALVE ACTUATING DEVICE HAVING A REDUCED IMPACT OPERATING MECHANISM

[75] Inventor: Benno Lebkuchner, Warwick, R.I.

[73] Assignee: Sparco Inc., Warwick, R.I.

[21] Appl. No.: 09/046,883

[22] Filed: Mar. 24, 1998

[51] Int. Cl.⁶ .................................................. F16K 31/04
[52] U.S. Cl. ........................ 251/77; 251/76; 251/129.11; 251/250
[58] Field of Search ............................... 251/76, 77, 250, 251/129.11

[56] References Cited

U.S. PATENT DOCUMENTS

| | | | |
|---|---|---|---|
| 2,052,987 | 9/1936 | Persons | 251/250 |
| 2,912,215 | 11/1959 | Forrester | |
| 4,318,530 | 3/1982 | Lissmyr et al. | |
| 4,551,072 | 11/1985 | Barall | |
| 4,807,700 | 2/1989 | Wilkins | 251/250 |
| 4,836,497 | 6/1989 | Beeson | 251/250 |
| 5,529,282 | 6/1996 | Lebkuchner | 251/250 |

Primary Examiner—Stephen M. Hepperle
Assistant Examiner—John Bastianelli
Attorney, Agent, or Firm—Salter & Michaelson

[57] ABSTRACT

A valve actuating device is provided for opening and closing a valve of the type having a valve housing, a valve member sealingly engageable with a valve seat formed in the valve housing, and a valve stem attached to the valve member for moving the valve member between a closed position and an open position. The valve actuating device includes a housing threadably attached to the valve housing of the valve, and a motor, mounted on the housing, for driving a shaft having a pinion gear upon activating the motor. The device further includes a rack having a body with an end portion thereof engageable with the valve stem of the valve, and a rack segment, disposed between the rack and the pinion gear, for moving the rack between a first position in which the end portion of the rack engages the valve stem for maintaining the valve stem in its closed position, to a second position in which the rack is moved by the rack segment upon activation of the motor via the pinion gear of the motor for opening the valve. The rack segment enables the motor to decelerate at a predetermined rate of speed without coming to an abrupt stop. A pair of springs is provided for biasing the rack to its first position.

6 Claims, 7 Drawing Sheets

VALVE ACTUATING DEVICE HAVING A REDUCED IMPACT OPERATING MECHANISM

BACKGROUND OF THE INVENTION

This invention relates generally to valves used in a heating system. More particularly, the present invention relates to a valve actuating device for a zone heating and/or cooling system having a reduced impact operating mechanism which extends the life of the motor.

In zone heating and/or cooling systems, valves are provided for controlling the flow of heated or cooled fluid (e.g., water or coolant) to the zones they service. One type of valve well-known in the heating and cooling industry is a heat motor type valve which utilizes wax as a pressure medium for opening and closing a valve member. More particularly, wax, in its hardened state, is softened by suitable heating means for moving the valve member of the valve from its closed to its opened position. This type of valve is desirous in circumstances where the valve needs to be opened slowly to prevent water hammer in the system. Water hammer is caused by opening or closing a valve too quickly in a system thereby causing a pressure wave which moves back and forth within the system until the pressure wave comes into contact with another valve or an end of a particular branch of the system. However, the heat motor valve suffers from the limitation that it takes too long to heat the wax and therefore too long to open and close the valve member. Typically, such a valve takes approximately four minutes to open and six minutes to close. Contractors installing a heating and/or cooling system find the waiting period between the opening and closing of the valve too long to adequately test the valve after it has been installed in the system. Although the performance of such valves is not suspect, the waiting period causes many contractors to avoid using this type of valve.

As an alternative to the heat motor type valve, another valve available to contractors is actuated by a solenoid switch which immediately introduces or cuts-off fluid to the system. However, this valve has been known to cause water hammer since it opens and closes the valve too quickly. There is presently a need for a valve which does not open and close immediately as the solenoid switch actuated valve and takes less time to open and close than the heat motor type valve.

Reference can be made to U.S. Pat. No. 5,529,282 to Lebkuchner, which is assigned to the assignee of the present application, as a solution to the foregoing problems associated with the prior art. More specifically, this patent discloses a valve actuating device comprising a housing having a fitting which is threadably received by a fitting receiving formation of a valve for securing the housing to the valve. The device further includes an electric motor mounted on the housing, the motor being adapted to drive a shaft having a pinion gear upon its activation for opening the valve. A rack has teeth engageable with the pinion gear of the electric motor and an end portion engageable with a valve stem of the valve. The arrangement is such that the rack is movable upon activation of the motor from a first position in which the end portion of the rack engages the valve stem for maintaining the valve stem in its closed position against the bias of valve stem biasing means (e.g., a spring), to a second position in which, upon activation of the motor, the rack is moved via the pinion gear of the motor away from the valve stem thereby enabling the valve stem biasing means to move the valve member to its open position. Two springs bias the rack to its first position.

While certainly effective for its intended purpose, the actuator device disclosed in the Lebkuchner patent strains the motor unnecessarily as a result of the impacting of the rack between its first and second positions. Typically, the motor includes a gear box to further reduce the output speed to one to ten r.p.m. In this regard, the motor speed at the end of the return stroke (i.e., the rack's first position) may easily reach several thousand r.p.m. due to the biasing force of the springs. The rotation of the motor and gear box components are then suddenly decelerated to zero r.p.m. when the valve closes at the end of the return stroke. This sudden deceleration imparts forces on the motor and gear box components which are several times larger than the forces acting during the opening stroke (i.e., the rack's second position). The impacts caused by the rack on the motor reduces the overall life of the motor.

SUMMARY OF THE INVENTION

Accordingly, among the several objects of the present invention are the provision of a valve actuating device for opening and closing a valve of a zone heating and/or cooling system, the device opening the valve in approximately twenty to thirty seconds and closing the valve in four seconds; the provision of such a device which substantially eliminates water hammer; the provision of such a device which is easy to assemble in that it requires only minimal fasteners and can be assembled by hand and with a screwdriver; the provision of such a device having a linear design which provides strength and durability unlike designs utilizing linkages; the provision of such a device which may be quickly and easily replaced in existing systems; the provision of such a device which operates quietly; the provision of such a device which can be applied to valves having large flow capacities; the provision of such a device which can operate on only 0.25 amps; the provision of such a device which is compatible with electronic thermostats; and the provision of such a device which is simple in design and economical to manufacture.

In general, the present invention is directed to a valve actuating device for opening and closing a valve of the type having a valve housing, a valve member sealingly engageable with a valve seat formed in the valve housing, and a valve stem attached to the valve member for moving the valve member between a closed position and an open position. The valve actuating device comprises a housing threadably attached to the valve housing of the valve, and a motor mounted on the housing. The motor is adapted to drive a shaft having a pinion gear upon activating the motor. The device further comprises a rack having a body with an end portion thereof engageable with the valve stem of the valve, and moving means, disposed between the rack and the pinion gear, for moving the rack between a first position in which the end portion of the rack engages the valve stem for maintaining the valve stem in its closed position, to a second position in which the rack is moved by said moving means upon activation of the motor via the pinion gear of the motor for opening the valve. The moving means enables the motor to decelerate at a predetermined rate of speed without coming to an abrupt stop. Means is provided for biasing the rack to its first position.

More particularly, the moving means comprises a rack segment disposed within a slot formed in the body of the rack. The rack segment engages the pinion gear of the motor and selectively engages the rack for selectively moving the rack between its first and second positions. The slot has a length greater than the length of the rack segment for allowing the rack segment to move between an upper slot position and a lower slot position. Preferably, the rack segment is rectangularly-shaped and has teeth formed along one side thereof that are engageable with teeth of the pinion gear.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

Corresponding reference numerals designate corresponding parts throughout the several views of the drawings.

DETAILED DESCRIPTION OF THE PREFERRED EMBODIMENT

Figure 1:
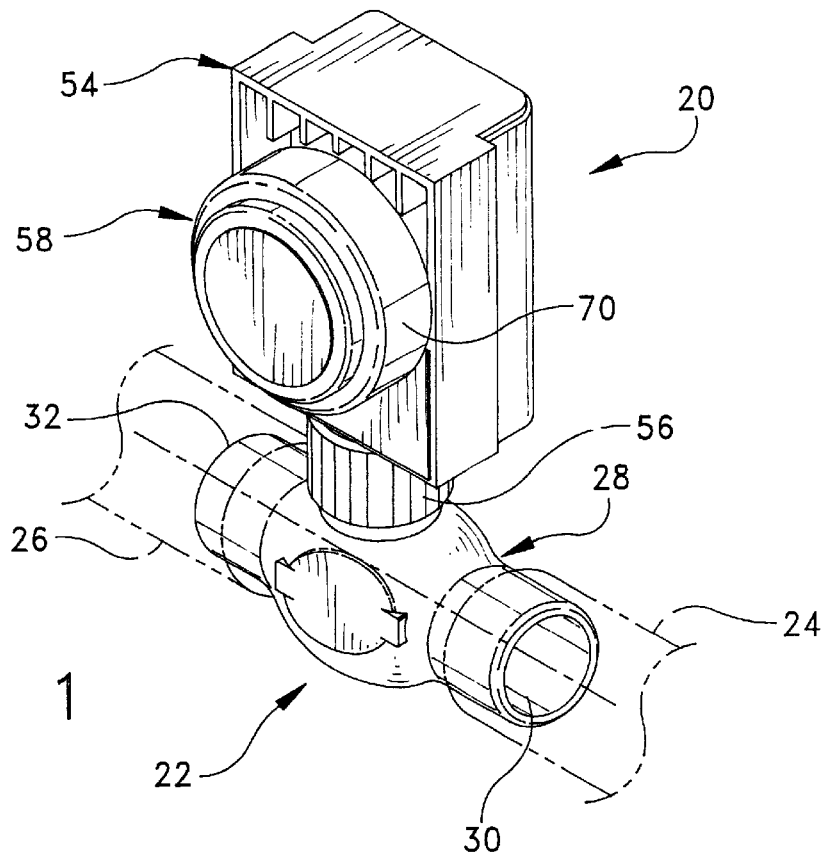
FIG. 1 is a front perspective view of a valve actuating device of the present invention, the device being threadably secured to a plunger-type valve.
Figure 2:
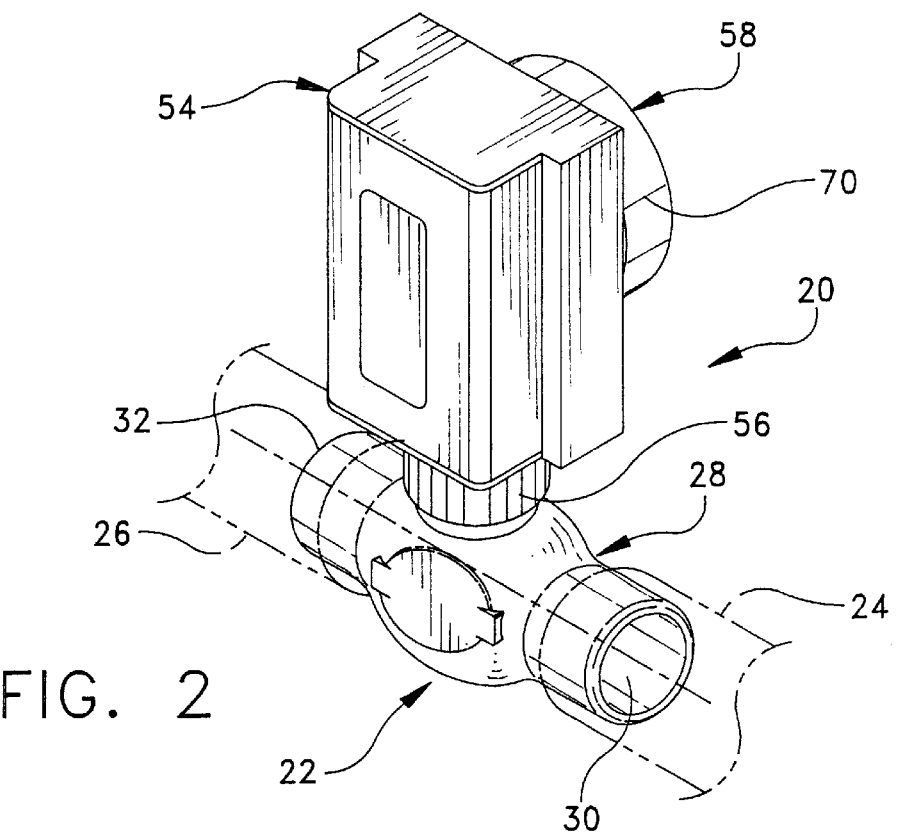
FIG. 2 is a rear perspective view thereof.

This invention progresses the basic concept taught in the above-identified U.S. Pat. No. 5,529,282, which is incorporated herein by reference. Briefly, and by way of review, there is generally indicated at 20 a valve actuating device for opening and closing a valve, generally indicated at 22. The valve 22 is part of a zone heating and/or cooling system having an inlet pipe 24 and an outlet pipe 26, both illustrated in broken lines in FIGS. 1 and 2, for connecting the valve 22 to the system. The valve actuating device 20 of the present invention is especially suited for delivering fluid (e.g., water or coolant) to a zone of the system when called upon at a rate which does not cause water hammer and which is not excessively slow.

Figure 3:
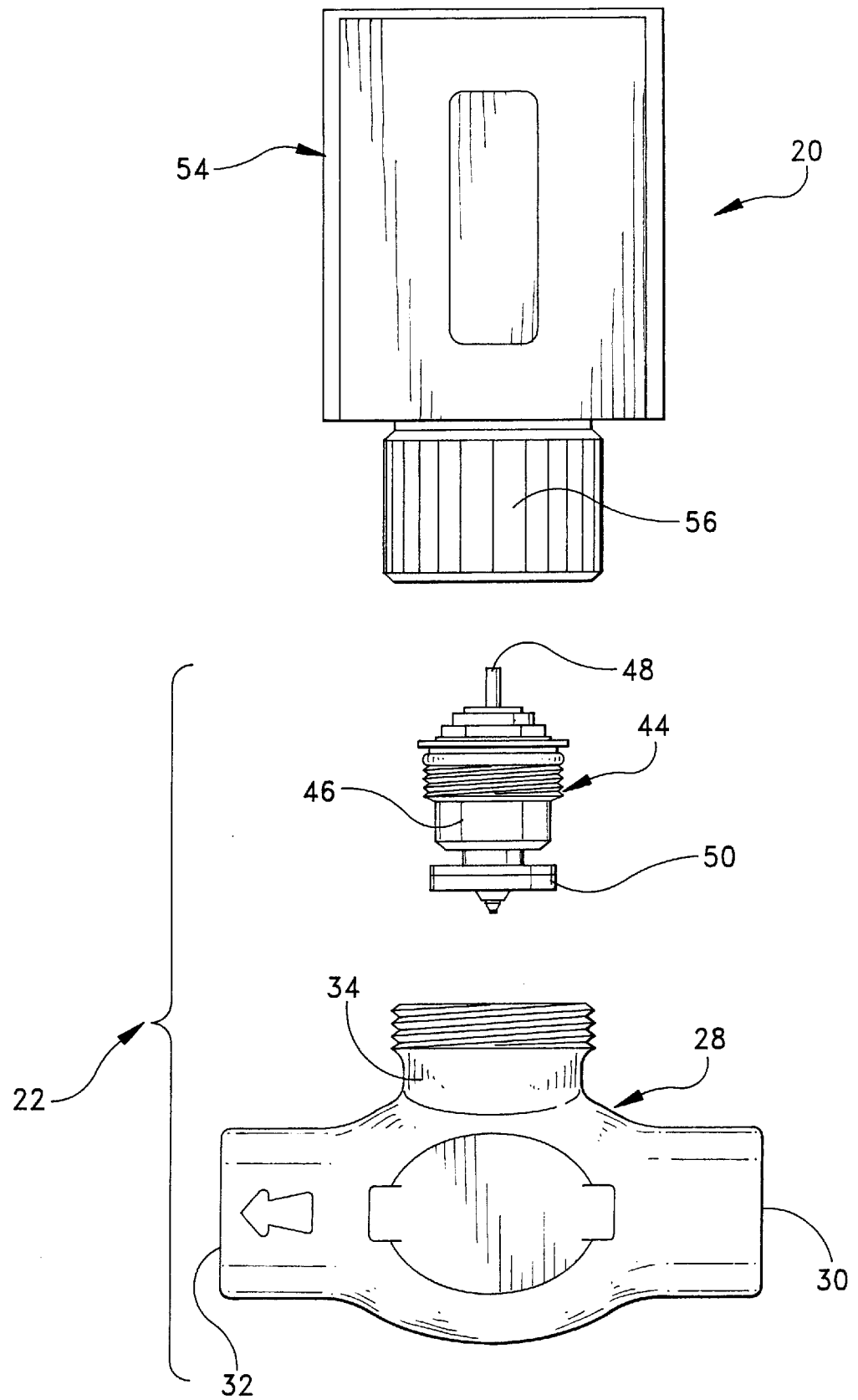
FIG. 3 is an exploded rear elevational view of a valve member and stem arrangement of the valve and the manner upon which the valve is secured to the valve actuating device.
Figure 4:
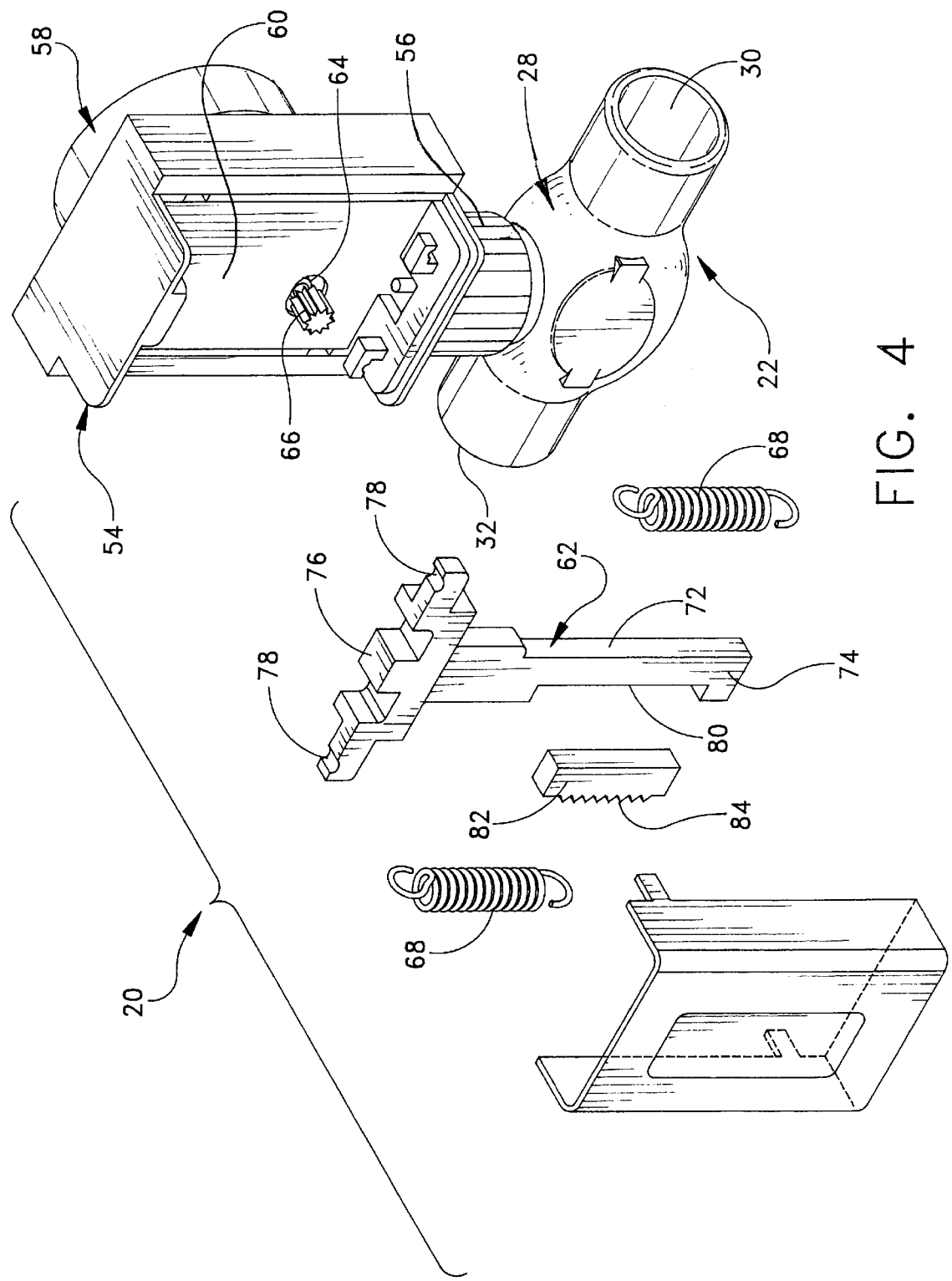
FIG. 4 is an exploded rear perspective view of the component parts of the valve actuating device.
Figure 5:
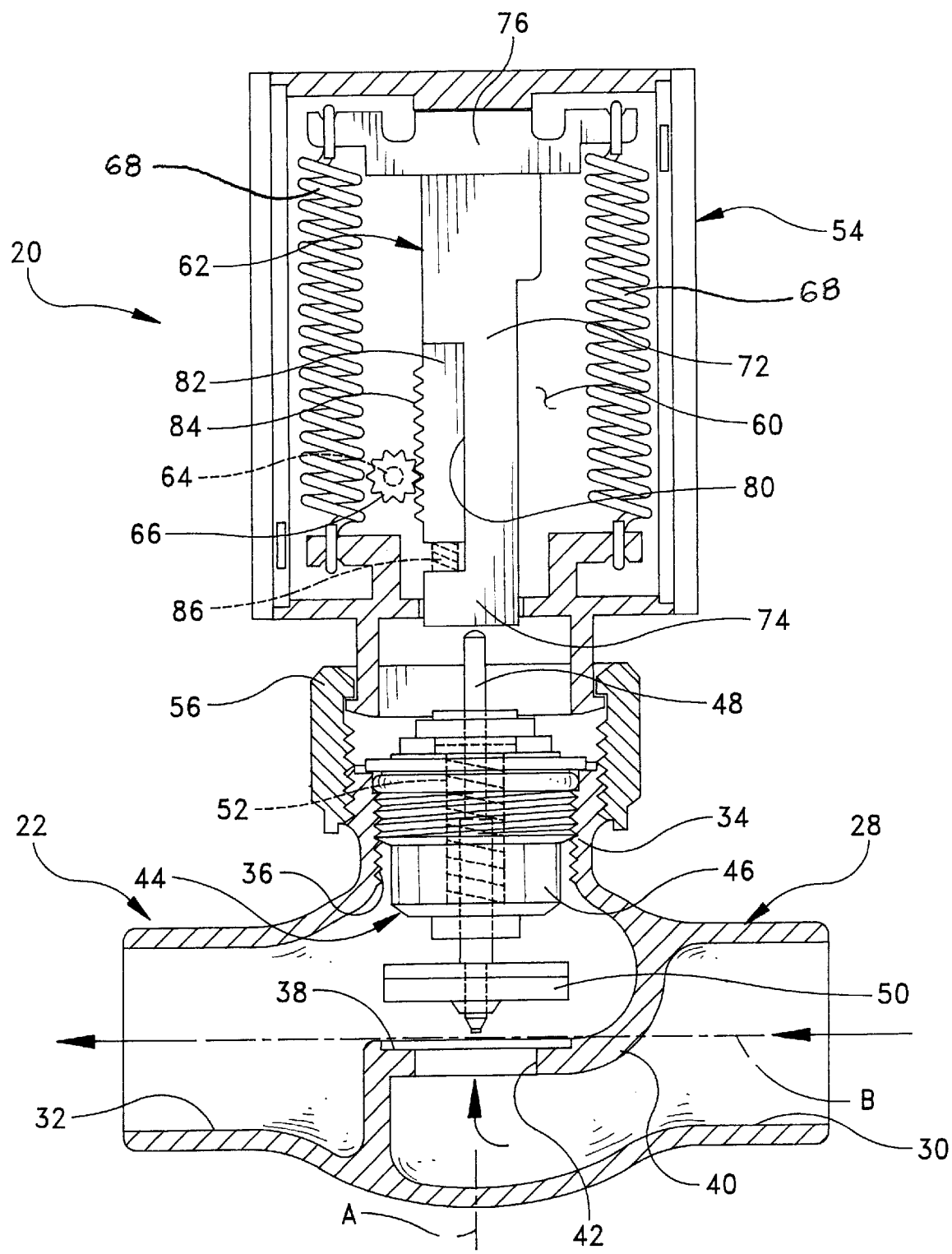
FIGS. 5–8 are cross-sectional views in elevation of the valve actuating device and the valve with the valve actuating device being illustrated in varying positions of operation.

Turning now to FIGS. 3–5, the valve 22 is a standard globe valve which is commonly found in such systems. As illustrated in these drawings, the valve 22 comprises a valve housing, generally indicated at 28, which is preferably fabricated from cast bronze. The valve housing 28 has an inlet 30 which is suitably connected to the inlet pipe 24 (e.g., soldering) and an outlet 32 which is connected to the outlet pipe 26 in an identical manner. The valve housing 28 also includes a fitting receiving formation 34 with an opening 36 formed therein which extends along an axis A generally transverse to an axis B which extends between the inlet 30 and the outlet 32. The valve housing 28 is provided with a valve seat 38 formed in a wall 40 that extends between the inlet 30 and the outlet 32. The valve seat 38 has an opening 42 formed therein which allows fluid to pass from the inlet 30 to the outlet 32.

As shown in FIGS. 3 and 5, the valve 22 further includes a plunger valve member assembly, generally indicated at 44, which includes a brass fitting 46 having threads for threadably engaging the female threads of the fitting receiving formation 34. The brass fitting 46 of the assembly houses a valve stem 48 which is axially movable in an up-and-down direction along axis A. At the lower end of the valve stem 48 is a valve member 50 fabricated from any suitable elastomeric material for sealingly engaging the valve seat 38 of the valve housing 28. The valve member 50 is circular in plan view and shaped for fully and sealingly engaging the valve seat for blocking the opening 42 formed in wall 40. The valve stem 48 can be moved axially along axis A for moving the valve member 50 between a closed position in which the valve member 50 sealingly engages the valve seat 38 for blocking the flow of fluid from the inlet 30 to the outlet 32 (see FIGS. 6–8) and an open position in which the valve member 50 is spaced from the valve seat 38 (see FIG. 5) for allowing fluid to pass from the inlet 30 to the outlet 32. The valve stem 48 is biased to its open position by a spring 52 which is illustrated in broken lines. Spring 52 is disposed between the bottom of brass fitting 46 and an annular flange 49 on valve stem 48. Spring 52 has a length which allows it to be tensionally fit between brass fitting 46 and annular flange 49, to bias the valve stem 48 in its open position. When the valve stem 48 is driven downward, as will be described below, spring 52 is compressed between brass fitting 46 and annular flange 49.

Referring now to FIGS. 4 and 5, the valve actuating device 20 comprises a generally box-shaped housing, generally indicated at 54. The housing 54 includes a fitting or collar 56 having internal threads which, when securing the valve actuating device 20 to the valve 22, threadably engage the outer threads of the fitting receiving formation 34 of the valve 22. When assembled, the device 20 and valve 22 assume the configuration illustrated in FIGS. 1 and 2.

A motor, generally designated 58, is mounted on an interior wall 60 of the housing 54. The motor 58 is provided for reciprocally moving a T-shaped rack, generally indicated at 62, which engages the valve stem 48 of the valve 22 for moving the valve member 50 between its opened and closed positions. More particularly, the motor 58 is an electric motor having a shaft 64 which extends through an opening (not designated) formed in the interior wall 60. At the outer end of the shaft 64 of the motor 58 is a pinion gear 66 which is adapted to engage the rack 62 for moving the rack 62 along axis A. As shown, when the valve actuating device 20 is attached to the valve 22, the rack 62 engages the valve stem 48 of the valve 22 for maintaining the valve member 50 in its closed position. The arrangement is such that the rack 62 is movable upon activation of the motor 58 from a lower first position in which the rack 62 engages the valve stem 48 for maintaining the valve member 50 in its closed position against the force of the spring 52 (see FIGS. 6–8), to an upper second position in which the rack 62 is moved away from the valve stem 48 thereby enabling the spring 52 to move the valve stem 48 to its open position (see FIG. 5). This is accomplished by activating the motor 58 which rotates the pinion gear 66 counterclockwise for linearly driving the rack 62 upwardly along axis A in a manner to be described in greater detail below.

Figure 6:
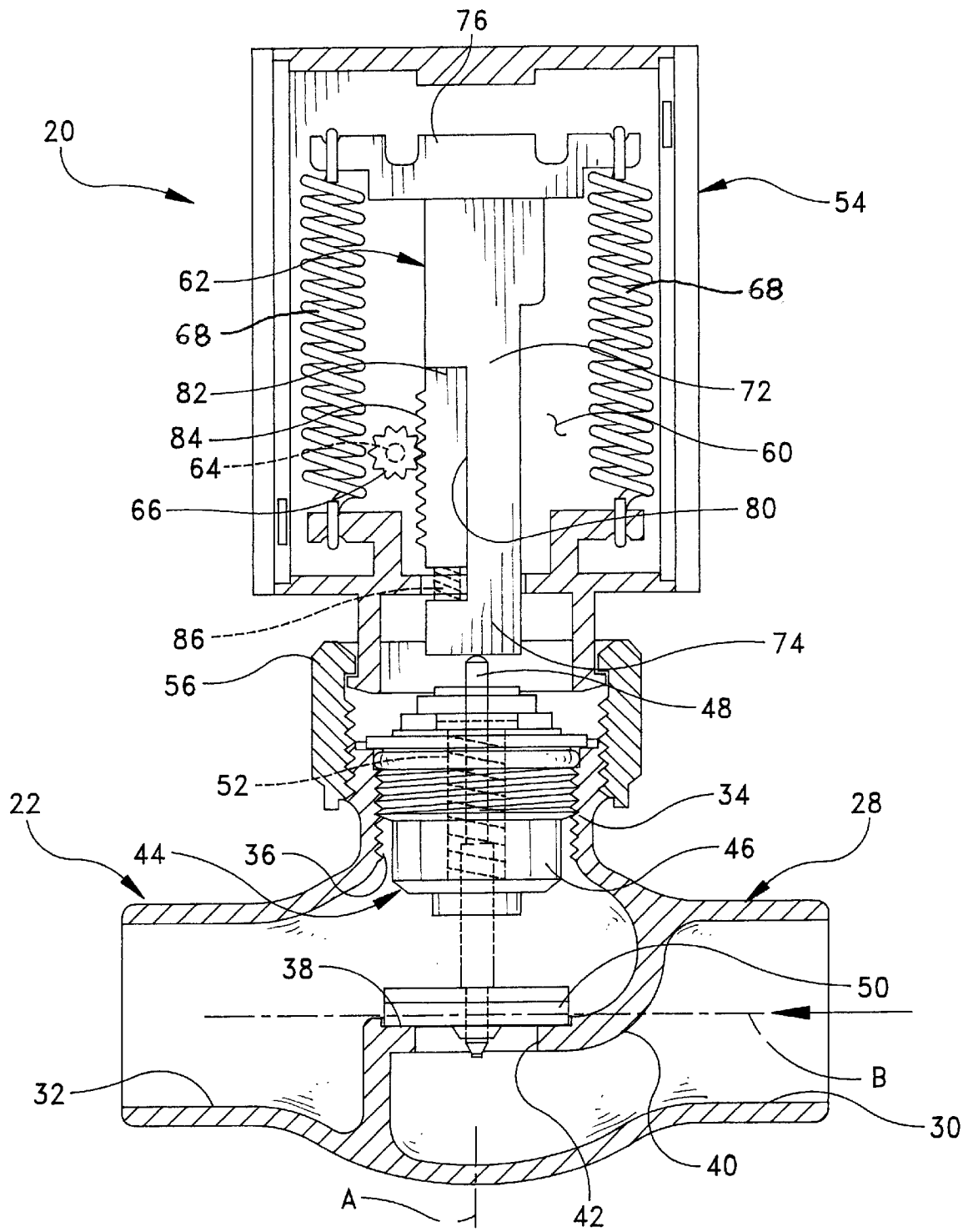
Figure 7:
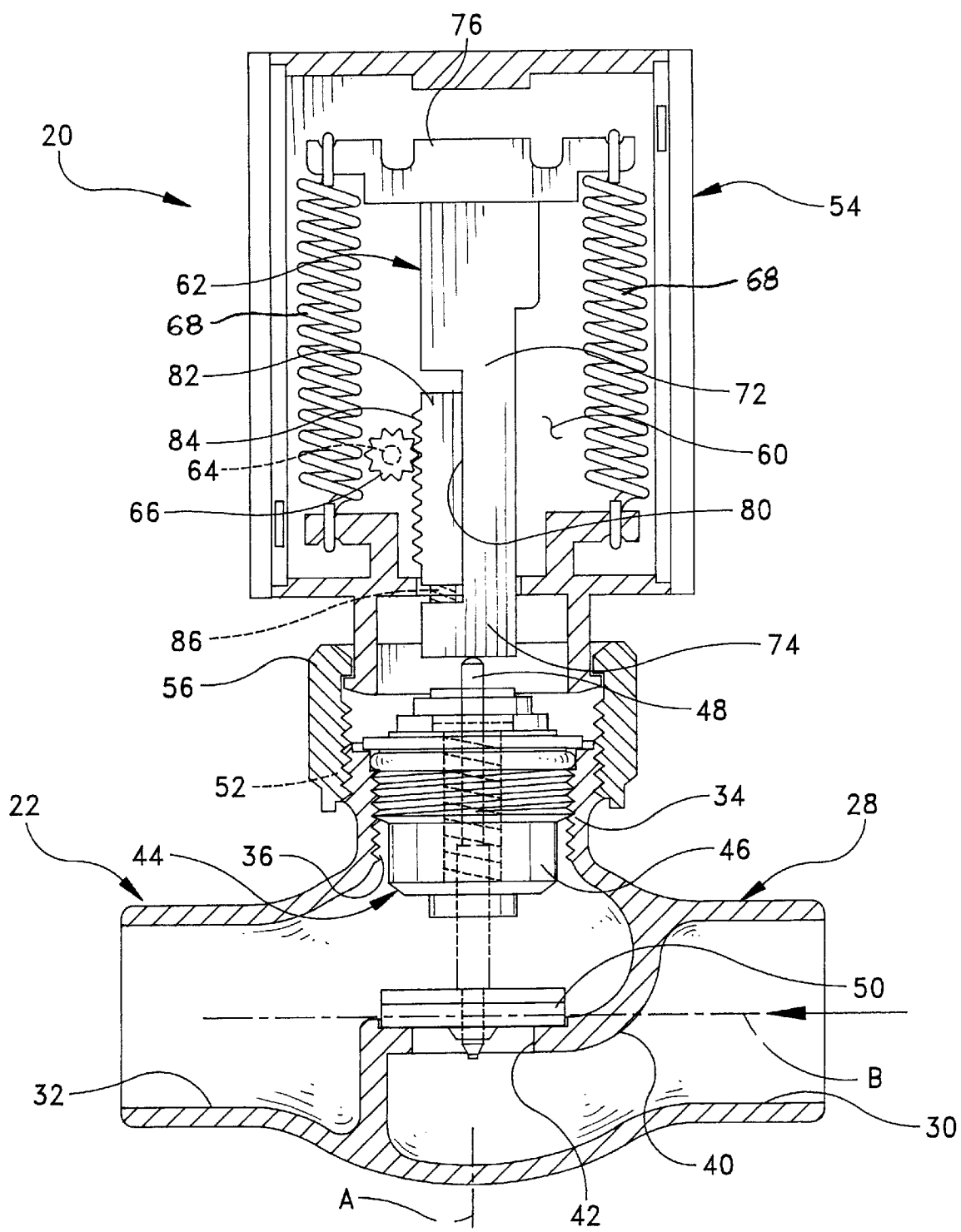
Figure 8:
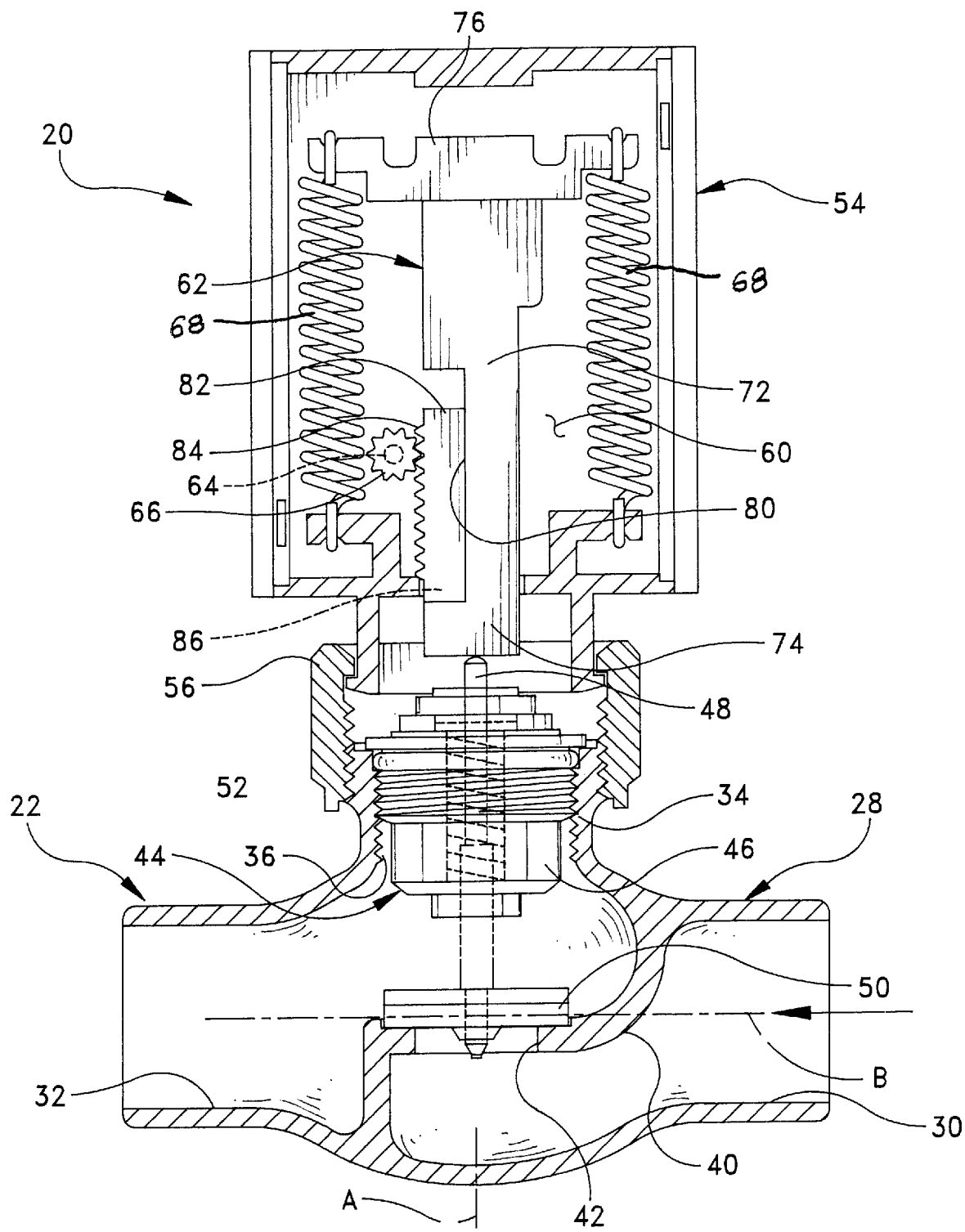

A pair of springs, each indicated at 68, are attached to the rack 62 to bias the rack to its first position when the motor 58 is de-energized (FIGS. 6–8). Positioning members (not shown) are located on either side of the rack 62 to engage the rack for vertically orienting it within the housing 54 along axis A and for prohibiting any lateral movement of the rack 62 while enabling its up-and-down movement.

FIGS. 6–8 illustrate the rack 62 in its first position in which the valve member 50 of the valve 22 is sealingly engaged with the valve seat 38 for blocking flow of fluid from the inlet 30 to the outlet 32. The downward force caused by springs 68 is greater than the upward force caused by spring 52 of the valve 22. Thus, the rack 62 is biased downwardly in its first position for maintaining the valve member 50 in its closed position. FIG. 5 illustrates the rack 62 in its second position after the motor 58 has been activated. More particularly, upon activation of the motor 58, the pinion gear 66 rotates counterclockwise for moving the rack 62 upwardly against the bias of springs 68. This action moves the rack 62 away from the valve stem 48 of the valve 22. As the rack 62 moves away from the valve stem 48 of the valve 22, the spring 52 moves the valve stem 48 upwardly thereby moving the valve member 50 away from the valve seat 38 for allowing fluid to pass from the inlet 30 to the outlet 32. The motor 58 is preferably designed to rotate the pinion gear 66 at a speed which opens the valve 22 in approximately twenty to thirty seconds and closes the valve 22 in approximately four seconds. It should be noted that the motor 58 should produce a sufficient amount of torque to overcome the downward force caused by springs 68.

The motor 58 is attached to the housing 54 in the manner disclosed in the Lebkuchner patent. Briefly, and by way of review, the motor 58 comprises a cylindrical casing 70 which contains a power source (e.g., a coil) and a teardrop-shaped gear box casing (not shown, but disclosed in the Lebkuchner patent) which contains necessary gearing to drive the shaft 64 and the pinion gear 66. The outer wall of the housing 54 is shaped for receiving the gear box casing in a position in which the shaft 64 and the pinion gear 66 extend through the opening formed in the interior wall 60 of the housing 54. Suitable wiring (not shown) electrically connects the motor 58 to a control (not shown). The motor 58 of the device 20 is preferably designed to operate on only 0.25 amps. Preferably, the motor 58 is a "Synchron"® motor sold by Hansen of Princeton, Ind. A cover (not designated) is provided for closing the other side of the housing 54 (see FIG. 4).

Still referring to FIGS. 5–8, as mentioned above, the rack 62 includes a T-shaped body having an elongate section 72 with an end portion 74 engageable with the valve stem 48 of the valve 22. The body of the rack further includes a cross section 76 that is formed with notches 78 to receive the ends of the springs 68 for securely retaining the springs 68 in a flexed condition.

The device 20 described thus far is substantially similar to the device disclosed int he Lebkuchner patent. In this regard, the present invention is directed to the provision of the elongate section 72 having a rectangularly-shaped slot or cutout 80 formed therein, the slot receiving a rack segment 82 of the present invention therein. The rack segment 82 has a plurality of teeth 84 formed along one side thereof that are engageable with the pinion gear 66 for linearly moving the rack segment 82 up and down within the slot 80. The arrangement is such that when the pinion gear 66 rotates clockwise, the rack segment 82 moves vertically downwardly, and when the pinion gear 66 rotates counterclockwise, the rack segment 82 moves vertically upwardly. The length of the slot 80 is greater than the length of the rack segment 82 for allowing the segment to move longitudinally along axis A within the slot between an upper position in which the rack segment 82 engages the elongate section 72 of the rack 62 at an upper end of the slot 80 and a lower position in which the rack segment 82 engages the elongate section 72 at a lower end of the slot 80. This arrangement reduces the deceleration forces of the motor 58 on the rack 62.

Referring to FIG. 5, as mentioned above, the valve 22 is in the fully open position and the rack 62 is in its second position. Prior to being moved to the second position, the motor 58 provides a torque to overcome the forces of the two return springs 68 to move the rack segment 82 and the rack 62 upwardly along axis A. As shown, the rack segment 82 engages the elongate section 72 of the rack 62 at the upper end of the slot 80.

Turning now to FIG. 6, upon de-energizing the motor 58, the springs 68 engage the cross section 76 of the rack 62 to force the rack to its first position. As shown, the rack segment 82 is still positioned in the upper end of the slot 80.

FIG. 7 illustrates the rack segment 82 in a midway position within the slot 80 after the rack 62 and the valve stem 48 have come to an abrupt stop. The rack segment 82 is free to continue to move downwardly wherein the downward motion is no longer driven by the action of the return springs 68 but only by the inertia of the motor 58. The coil and gear box friction of the motor 58 will eventually cause the pinion gear 66 rotation to cease (e.g., between the upper and lower slot ends). Therefore, the coil and gear box are allowed to coast to a gentle stop without imparting large forces thereon. Accordingly, less strain is placed on the motor 58 since the impacting forces caused by the rack 62 are greatly reduced. FIG. 8 illustrates the rack segment 82 after it has come to a stop at the lower end of the slot 80.

It should be noted that the downward motion of the rack segment 82 can be stopped by the lower end of slot 80 before it has coasted to a complete stop. This can be tolerated if at the moment of impact the pinion gear 66 rotational speed has been reduced by friction to an amount where the impact forces are negligible. If desired, however, a spring or any other cushioning device could be inserted between the lower end of the rack segment 82 and the lower end of the slot 80 to further soften the impact. This feature is illustrated in broken lines by reference numeral 86 in FIG. 5.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A valve actuating device for opening and closing a valve having a valve housing, a valve member sealingly engageable with a valve seat formed in the valve housing, and a valve stem attached to the valve member for moving the valve member between a closed position and an open position, the valve stem being biased to its open position, said valve actuating device comprising:

a housing threadably attached to the valve housing of the valve;

a motor mounted on said housing, said motor being adapted to drive a shaft having a pinion gear mounted thereon upon activation of the motor;

a rack having a body with an end portion thereof engageable with the valve stem of the valve;

a rack segment, disposed between the rack and the pinion gear, for moving the rack from a first position in which the end portion of the rack engages the valve stem for maintaining the valve stem in its closed position, to a second position in which the rack is moved by said rack segment upon activation of the motor via the pinion gear of the motor for opening the valve; said rack and said rack segment being constructed and arranged such that said rack segment enables the motor to decelerate at a predetermined rate of speed without coming to an abrupt stop; and means biasing the rack to its first position.

2. A valve actuating device as set forth in claim 1, wherein said rack segment is disposed within a cutout formed in the body of the rack, said rack segment engaging the pinion gear of the motor and engaging the rack for moving the rack from the first position to the second position.

3. A valve actuating device as set forth in claim 2, said cutout having a length greater than the length of the rack segment for allowing the rack segment to move between an upper cutout position and a lower cutout position.

4. A valve actuating device as set forth in claim 2, said rack segment being rectangularly-shaped and having teeth formed along one side thereof that are engageable with teeth of the pinion gear.

5. A valve actuating device as set forth in claim 4, said cutout having a length greater than the length of the rack segment for allowing the rack segment to move between an upper cutout position and a lower cutout position.

6. A valve actuating device for opening and closing a valve, the valve having a valve housing, a valve member sealingly engageable with a valve seat formed in the valve housing and a valve stem attached to the valve member for moving the valve member between a closed position and an open position, the valve actuating device comprising:

a housing which is constructed and arranged to be attachable to the valve housing of the valve;

a motor mounted on said housing;

a pinion gear which is coupled to said motor by a shaft, said pinion gear being drivable by said motor;

a rack including a body having an end portion which is engageable with the valve stem of the valve, and a longitudinal cutout along a side thereof, said longitudinal cutout having a length, said rack being moveable between a first position in which the end portion of the rack engages the valve stem for maintaining the valve member in its closed position and a second position in which said valve member is enabled to be moved to said open position; and a rack segment slidably mounted within said longitudinal cutout of said rack, said rack segment having a length which is less than the length of said longitudinal cutout, said pinion gear engaging said rack segment for slidably moving the rack segment between a top and a bottom of said longitudinal cutout, wherein, when said rack segment engages said top of said cutout, said rack segment moves the rack to said second position for opening the valve.

* * * * *